United States Patent [19]
Kikuchi

[11] Patent Number: 5,597,176
[45] Date of Patent: Jan. 28, 1997

[54] PASSENGER-SIDE AIRBAG DEVICE FOR A VEHICLE

[75] Inventor: Hirohiko Kikuchi, Saitama, Japan

[73] Assignee: Kansei Corporation, Saitama, Japan

[21] Appl. No.: 500,440

[22] Filed: Jul. 10, 1995

[30] Foreign Application Priority Data

| Jul. 11, 1994 | [JP] | Japan | 6-158873 |
| Jul. 11, 1994 | [JP] | Japan | 6-158874 |
| May 15, 1995 | [JP] | Japan | 7-115448 |

[51] Int. Cl.[6] ............................................. B60R 21/16
[52] U.S. Cl. ........................................ 280/728.2; 24/711.1
[58] Field of Search .......................... 280/728.1, 728.2, 280/728.3, 731, 732, 743.1; 24/711.1, 907, 72.7, 588, 698.1

[56] References Cited

U.S. PATENT DOCUMENTS

| 3,273,705 | 9/1966 | Rieger et al. | 24/711.1 |
| 3,508,303 | 4/1970 | Miyasaka | 24/711.1 |
| 4,842,300 | 1/1989 | Ziomek et al. | 280/732 |
| 5,069,480 | 12/1991 | Good | 280/728.2 |
| 5,074,584 | 12/1991 | Jarboe | 280/743.1 |
| 5,184,843 | 2/1993 | Berger et al. | 280/728.2 |
| 5,263,739 | 11/1993 | Webber et al. | 280/728 |
| 5,284,358 | 2/1994 | Rhein | 280/728.2 |
| 5,366,240 | 11/1994 | Hanabusa et al. | 280/728.2 |
| 5,419,584 | 5/1995 | Halford | 280/728.2 |
| 5,468,011 | 11/1995 | Donegan et al. | 280/728.2 |

FOREIGN PATENT DOCUMENTS 4309925 10/1993 Germany.

*Primary Examiner*—Paul N. Dickson
*Attorney, Agent, or Firm*—Morrison Law Firm

[57] ABSTRACT

A passenger-side airbag device includes a container divided into a bag storage area and an inflator storage area. The perimeter of the inflator storage area is smaller than the perimeter of the bag storage area to create a shelf in the container to support an uninflated airbag. A rim around an opening of the airbag is attached to the container using a plurality of resiliently deformable resin clips. A shaft connecting the container to a pocket in the airbag rim is optionally added for greater support when the airbag is inflated.

4 Claims, 8 Drawing Sheets

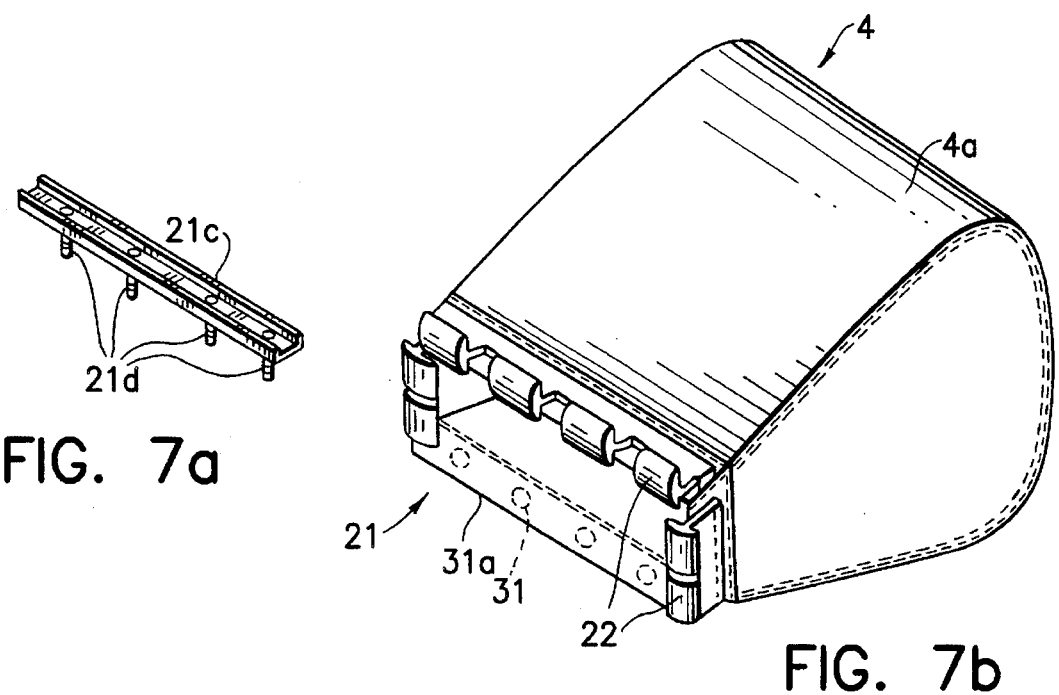
FIG. 7a
FIG. 7b
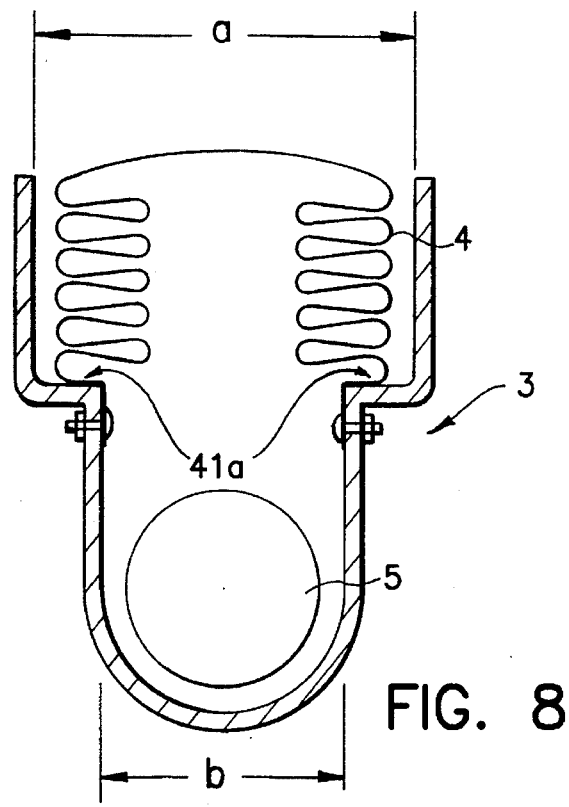
FIG. 8

PASSENGER-SIDE AIRBAG DEVICE FOR A VEHICLE

BACKGROUND OF THE INVENTION

The present invention relates to a passenger-side airbag installed in a car for passenger safety. In particular, the present invention relates to an improvement in a bag storage area holding the passenger-side airbag.

Referring to FIG. 12, a prior art example of a passenger-side airbag 4' is mounted on a retainer 25'. An inflator 5' is stored inside a base 6a. Retainer 25' and airbag 4' are fitted in base 6a over inflator 5'. A guide 7a, fitting over retainer 25' and airbag 4', attaches to an upper rim of base 6a. Retainer 25' is a mounting base for airbag 4' permitting airbag 4' to remain in a folded condition ready to use.

Referring to FIGS. 11a–11b, another prior art example of a passenger-side airbag 4" includes a rim 21' around an opening of a main bag unit 4b. Main bag unit 4b is of a suitable fabric. Two retainers 21g and 21f are mounted at rim 21'. Rim 21' is rectangularly shaped with fabric on all four sides folded back separately and sewn. A plurality of rim portions 21a, 21b are shaped so that a plurality of retainers 21g, 21f are inserted into rim portions 21a, 21b respectively. Retainers 21g, 21f attach rim 21' by a plurality of stud bolts 21d to a container (not shown) as described in Japanese Utility Model Laid-Open Publication Number 4-93243.

In this type of prior art device, assembly is difficult because stud bolts 21d obstruct each other when retainers 21g, 21f are inserted into rim portions 21a, 21b of rim 21' during assembly. In addition, each stud bolt 21d is attached to a hole in the container (not shown) by a nut. Assembly requires a large number of parts and a great amount of labor.

OBJECTS AND SUMMARY OF THE INVENTION

An object of the present invention is to provide a passenger-side airbag device that overcomes the limitations and drawbacks of the prior art.

Another object of the present invention is to provide a passenger-side airbag having fewer parts than the prior art.

Another object of the present invention is to provide a passenger-side airbag that is easily assembled.

Briefly stated, a passenger-side airbag device includes a container divided into a bag storage area and an inflator storage area. Making a perimeter of the inflator storage area smaller than a perimeter of the bag storage area creates a shelf in the container to support an uninflated airbag. A rim around an opening of the airbag is attached to the container using a plurality of resiliently deformable resin clips. A shaft connecting the container to a pocket in the airbag rim is optionally added for greater support when the airbag is inflated.

According to an embodiment of the invention, an airbag device for a vehicle includes a container, an inflator storage area in the container, an inflator in the inflator storage area, a bag storage area in the container for storing an airbag, a perimeter of the inflator storage area being smaller than a perimeter of the bag storage area, thereby creating a shelf for the airbag to rest upon when uninflated, means for connecting the inflator to the container, the airbag having an opening, a rim around the opening, and means for attaching the rim to the container.

According to a feature of the invention, the means for attaching the rim to the container includes a plurality of resiliently deformable resin clips, a corresponding plurality of slots in a wall of the bag storage area, and means for deforming the resin clips during insertion of the resin clips into the slots, whereby the resin clips resume their original shape after completion of insertion into the slots.

According to an embodiment of the invention, an airbag device for a vehicle includes a container, an inflator storage area in the container, an inflator in the inflator storage area, a bag storage area in an upper portion of the container for storing an airbag, a perimeter of the inflator storage area being smaller than a perimeter of the bag storage area, thereby creating a shelf for the airbag to rest upon when uninflated, means for connecting the inflator to the container, the airbag having an opening, a rim around the opening, a pocket in a lengthwise side of the rim, a bag support piece transversely connected to the container in an upper portion of the inflator storage area, and the bag support piece having a hole therein, thereby permitting a shaft inserted through the pocket and the hole.

According to an embodiment of the invention, a resin clip for an airbag device includes an attachment portion having a first end attached to the rim, an initial insertion piece attached to a second end of the attachment portion, a hook attached to the initial insertion piece and to the second end of the attachment portion, the initial insertion piece deformably passing into the corresponding slot before the hook when attaching the airbag to the wall, and the initial insertion piece and the hook resiliently resuming an original shape after deformably passing into the corresponding slot, whereby the initial insertion piece and the hook attach the rim of the airbag to the wall.

According to an embodiment of the invention, a resin clip for an airbag device includes an attachment portion having a first end attached to the rim, an initial insertion piece attached to a second end of the attachment portion, a hook attached to the initial insertion piece and to the second end of the attachment portion, the initial insertion piece deformably passing into the corresponding slot before the hook when attaching the airbag to the wall, the initial insertion piece and the hook resiliently resuming an original shape after deformably passing into the corresponding slot, whereby the initial insertion piece and the hook attach the rim of the airbag to the wall, at least one resin clip enveloped by a cloth at the rim of the airbag, and the at least one resin clip fitted into the corresponding slot while enveloped.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 7a is a perspective drawing of a retainer around an opening of an airbag according to an embodiment of the present invention.

FIG. 7b is a perspective drawing of a rim around an opening of an airbag according to an embodiment of the present invention.

FIG. 8 is a cross-section view of a shelf of an alternative embodiment of the present invention.

DETAILED DESCRIPTION OF THE PREFERRED EMBODIMENT

Figure 1:
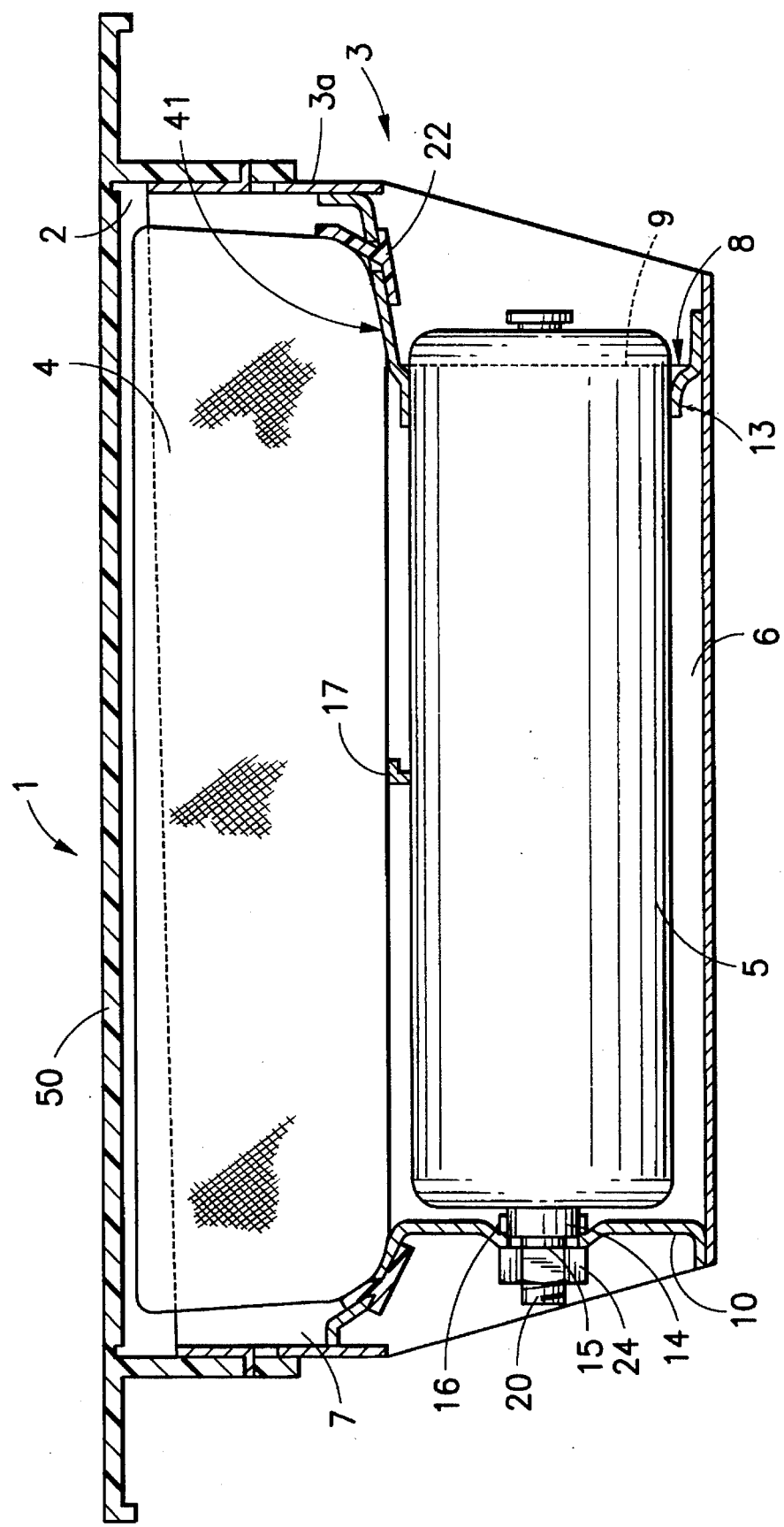
FIG. 1 is a cross-section side view of an airbag device according to an embodiment of the present invention.
Figure 4:
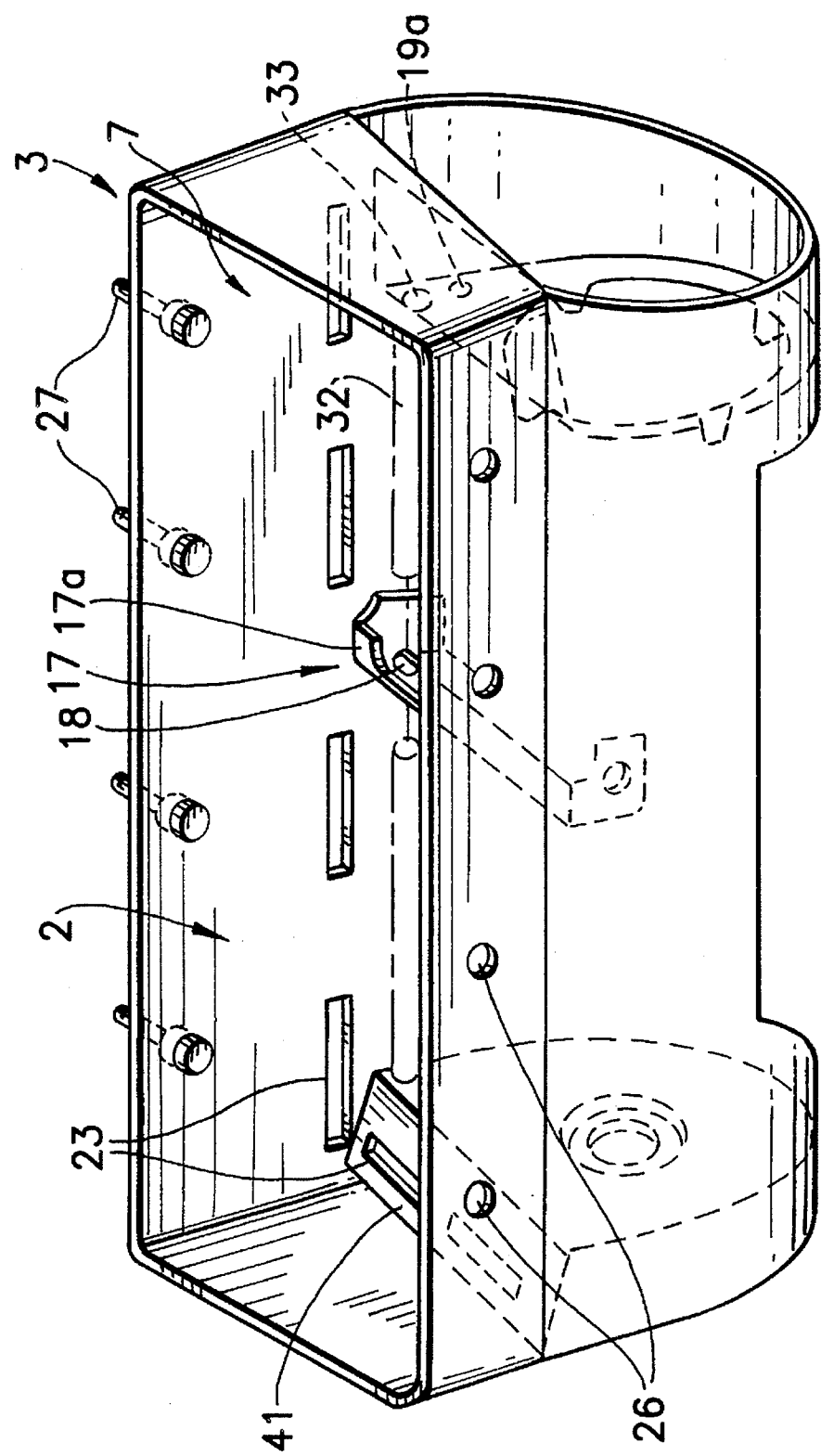
FIG. 4 is a perspective drawing of a container for an airbag according to an embodiment of the present invention.
Figure 5:
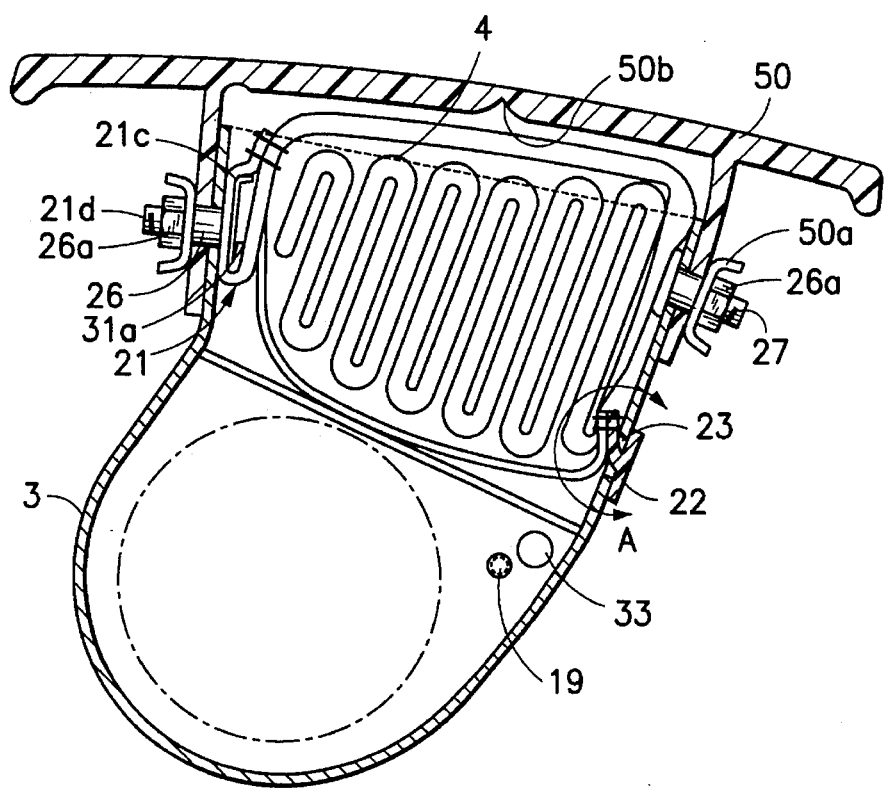
FIG. 5 is a cross-section view of an embodiment of the airbag device of the present invention.

Referring to FIGS. 1 and 4, a passenger-side airbag device 1 includes a container 3 and a cover 50. A container main unit 3a of container 3 includes a bag storage area 7 in the shape of a box with its end lids removed. Cover 50 fits over an opening 2 in a top side of bag storage area 7. An airbag 4, of cloth or other suitable fabric, fits into bag storage area 7. A bottom side of bag storage area 7 opens into an inflator storage area 6, which is roughly cylindrical. A bottle shaped inflator 5 is contained in inflator storage area 6. Inflator storage area is bounded on both ends by side plates 8 and 10.

Figure 2:
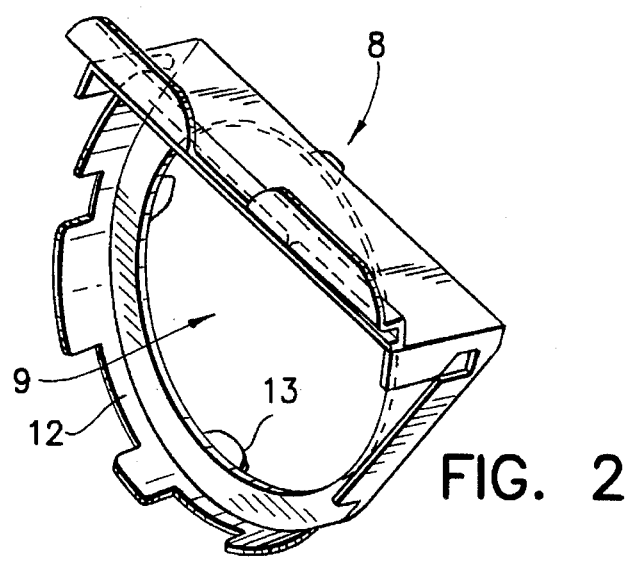
FIG. 2 is a side perspective view of a side plate according to an embodiment of the present invention.
Figure 3:
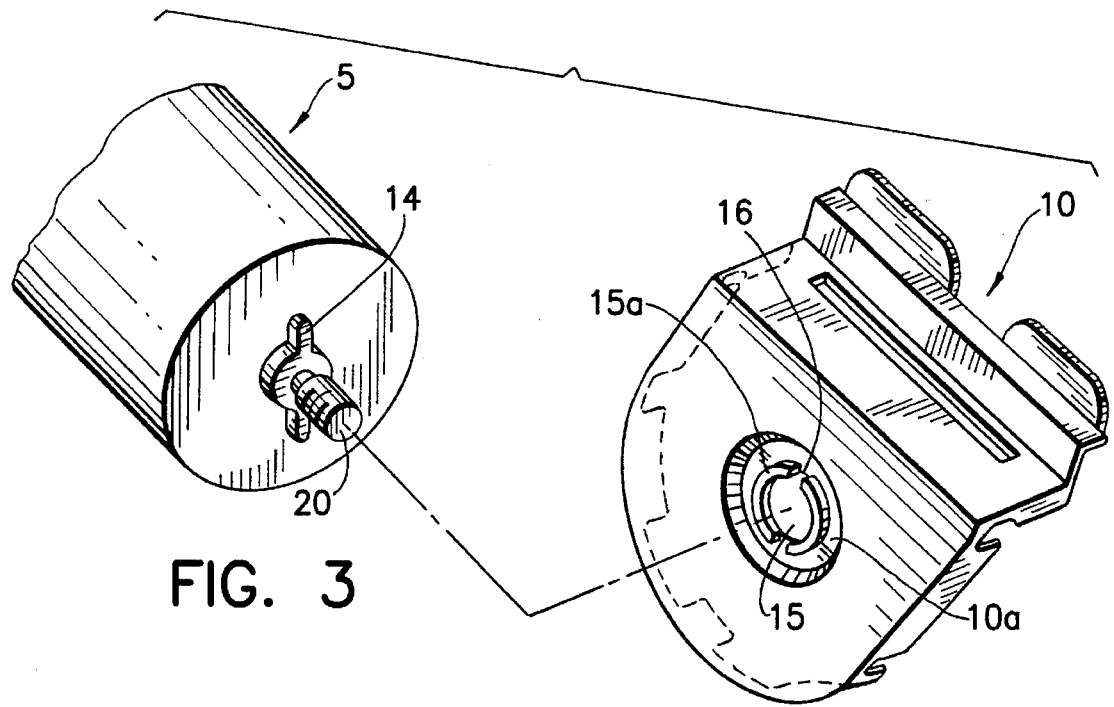
FIG. 3 is a side perspective view of an inflator and a side plate according to an embodiment of the present invention.

Referring to FIGS. 1–3, inflator 5 is attached to container 3 by inserting inflator 5 through an aperture 9 in side plate 8. A forward end of inflator 5 is fixedly coupled to side plate 10 using any conventional coupling. In the preferred embodiment, a bolt 20 on the forward end of inflator 5 includes an engagement portion 14 at its base. A collar 15a surrounds a boss 10a extending from side plate 10 of container 3. A bolt hole 15 is centered in boss 10a. A cutout portion 16 of collar 15a receives engagement portion 14 of bolt 20 to fix inflator 5 in a specified orientation. A nut 24 screws onto bolt 20 to securely attach inflator 5 to side plate 10.

A plurality of tongues 13 in an outer rim 12 of side plate 8 extend on both sides of side plate 8. A portion of each tongue 13 extending outward permits connection of side plate 8 to container main unit 3a by any conventional means such as welding, brazing, riveting, or the like. Side plate 10 is similarly connected to container main unit 3a. A portion of each tongue 13 extending inward elastically supports inflator 5.

Referring to FIG. 4, a bag support piece 17 spans container 3 and is connected to it. Bag support piece 17 is centrally located along a length of container 3 to separate inflator storage area 6 from bag storage area 7. A guide hole 18 in bag support piece 17 is aligned with a similar size insertion hole 33 in side plate 8. A flange 17a on an upper portion of bag support piece 17 provides additional support for airbag 4. Bag support piece 17 prevents container 3 from being deformed by expansion force exerted by airbag 4 when airbag device 1 is activated.

Bag storage area 7 is longer than inflator support area 6. An offset is thus created between bag storage area 7 and inflator support area 6. An upper surface of this offset is a shelf 41, which supports two ends of airbag 4 when it is folded and stored in bag storage area 7.

A plurality of slots 23 are located on each shelf 41 and along a first lengthwise side of container 3. A plurality of stud bolts 27 extend through an upper portion of container 3 above each slot 23 along the same lengthwise side. A plurality of insertion holes 26, preferably four, are opposite stud bolts 27 in an upper portion of container 3 along a second lengthwise side.

Referring to FIGS. 7a–7b, airbag 4 includes a main bag unit 4a shown in its extended state. An opening of airbag 4 is rectangular in shape with a rim 21 which includes two short sides and first and second long sides. A plurality of resin clips 22 are positioned along the two short sides and the first long side of rim 21. The second long side is preferably folded back on itself forming a pocket 31a. A plurality of holes 31 are in the folded back portion. A retainer 21c preferably includes a plurality of integral stud bolts 21d corresponding to holes 31. Retainer 21c fits into pocket 31a of rim 21 when stud bolts 21d are inserted into holes 31 during assembly. Pocket 31a is then stitched in place, thereby securing retainer 21c to airbag 4.

Figure 6:
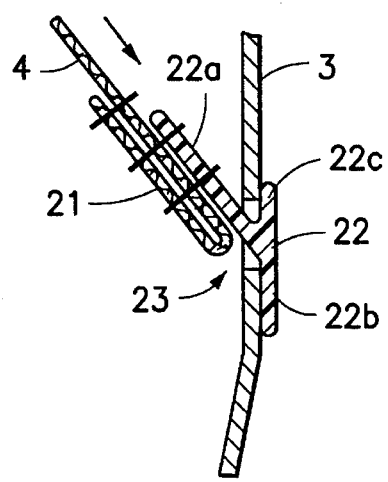
FIG. 6 is an enlarged view of a resin clip taken from section A of FIG. 5.

Referring to FIG. 6, resin clips 22 have roughly a "T" shaped cross section with an attachment portion 22a corresponding to the main stem of the "T". An initial insertion piece 22b corresponds to one side of the crossbar of the "T". A hook 22c corresponds to the other side of the crossbar. Hook 22c is shorter than initial insertion piece 22b. A width of each resin clip 22 is the same as or slightly smaller than a width of each slot 23. Resin clip 22 is of an elastically deformable material which remains flexible with high tensile strength at temperatures below 0° C. A synthetic resin such as NYLON 11 or a thermoplastic polyurethane resin is preferable. Resin clip 22 is not restricted to the above described shape, but can be any shape that fittingly engages slot 23.

Attachment portion 22a is preferably sewn to rim 21. Adhesive is optionally used for additional strength. Resin clip 22 preferably includes a heat-resistant protective coating (not shown) to resist heat generated by expansion of airbag 4.

Referring to FIGS. 5–7a and 7b, retainer 21c is inserted into rim 21 of airbag 4 by inserting stud bolts 21d through holes 31. Stud bolts 21d are inserted through insertion holes 26 in container 3, while resin clips 22 are fitted into slots 23. Initial insertion piece 22b is inserted into slot 23 before hook 22c when airbag 4 is attached to container 3. Resin clip 22 is deformed to permit insertion of hooks 22c through slot 23 during assembly. Hooks 22c elastically deform when pushed through slots 23 in a direction indicated by an arrow in FIG. 6. After insertion, resin clip 22 returns to its original shape shown, whereby hooks 22 c locks into place behind container 3. Hooks 22c engage the second lengthwise side of the upper portion of container 3 as well as shelf 41. Container 3 is then connected to a vehicle body. A cover 50 is fitted over the top of container 3. Each stud bolt 27 on the first lengthwise side of the upper portion of container 3 fits through a corresponding hole 50a in cover 50 and is secured by a nut 26a. Stud bolts 21d, extending through rim 21, are inserted through a plurality of insertion holes 26 in cover 50. Each stud bolt 21d is secured by its corresponding nut 26a. Cover 50 includes a notch 50b. When airbag device 1 is used, gas from inflator 5 causes airbag 4 to rapidly expand. A pressure from the expansion of airbag 4 breaks cover 50 at notch 50b, thereby ensuring that airbag 4 expands toward the passenger-side of the vehicle.

Referring also to FIG. 4, flange 17a supports a central portion of airbag 4, causing airbag 4 to press against an underside of cover 50 with sufficient force to prevent notch 50b from breaking inward.

Figure 9:
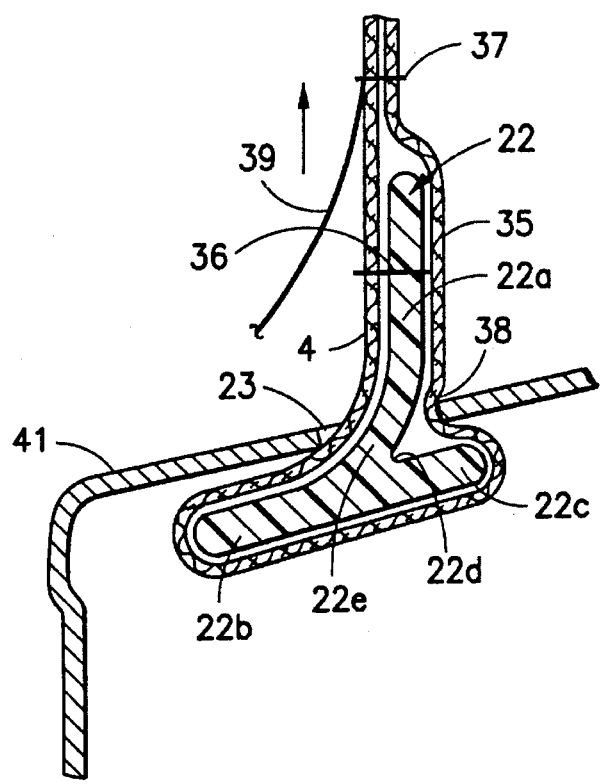
FIG. 9 is an enlarged view of an alternative embodiment of a resin clip taken from section A of FIG. 5.

Referring to FIG. 9, an alternative embodiment shows the attachment of resin clip 22 to airbag 4. Resin clip 22 is covered and protected by a portion of a reinforcing cloth 35, which reinforces airbag 4. Attachment portion 22a of resin clip 22 is sewn to the fabric of airbag 4 and reinforcement cloth 35 at a first sewn portion 36. At a second sewn portion 37, a folded-back and doubled-up portion of airbag 4 and reinforcement cloth 35 is sewn along with a flame-resistant cloth 39 that protects airbag 4 from heat. In this sewn state, a portion 38 of reinforcing cloth 35 is in a somewhat stretched state instead of aligning closely with an acute angle portion 22d of resin clip 22.

Resin clip 22 is fitted to slot 23 of shelf 41. Resin clip 22 is protected from shelf 41 by fabric of airbag 4. Slot 23 forces portion 38 toward the acute angle portion 22d of resin clip 22. When a stretching load from the expansion of airbag 4 is applied in the direction indicated by an arrow, portion 38 is extended to press firmly against a rim of slot 23. Portion 38 takes on a portion of a load acting on resin clip 22, thus decreasing the load to a neck 22e of resin clip 22. This arrangement also improves the gas seal. If neck 22e of resin clip 22 breaks from brittleness due to low temperatures, initial insertion portion 22b and hook portion 22c remain functional since they are enveloped by the cloth of airbag 4. Since initial insertion portion 22b and hook portion 22c remain in container 3, airbag 4 is kept reliably engaged even if resin clip 22 breaks. Therefore, resin clip 22 has improved tolerance to low-temperature brittleness, thus allowing the use of less expensive material.

Figure 10:
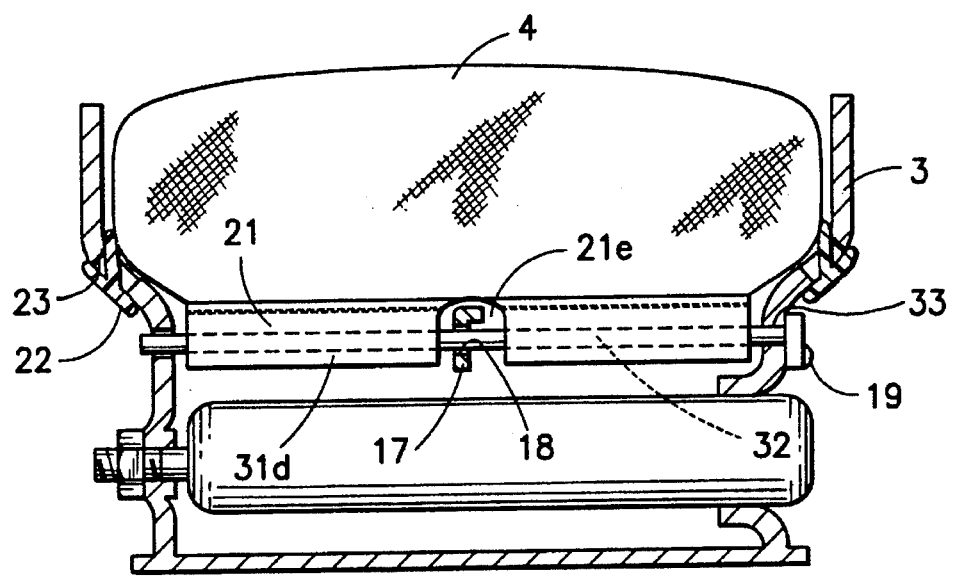
FIG. 10 is a cross section view of an alternative embodiment of the present invention.
Figure 11A:
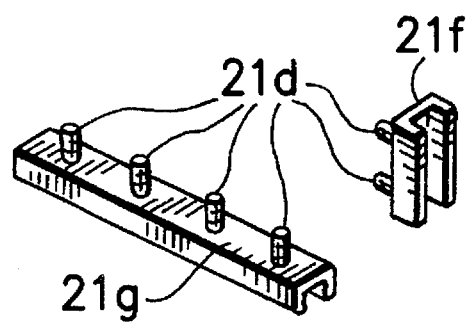
FIG. 11a is a perspective view of a retainer of a prior art device.
Figure 11B:
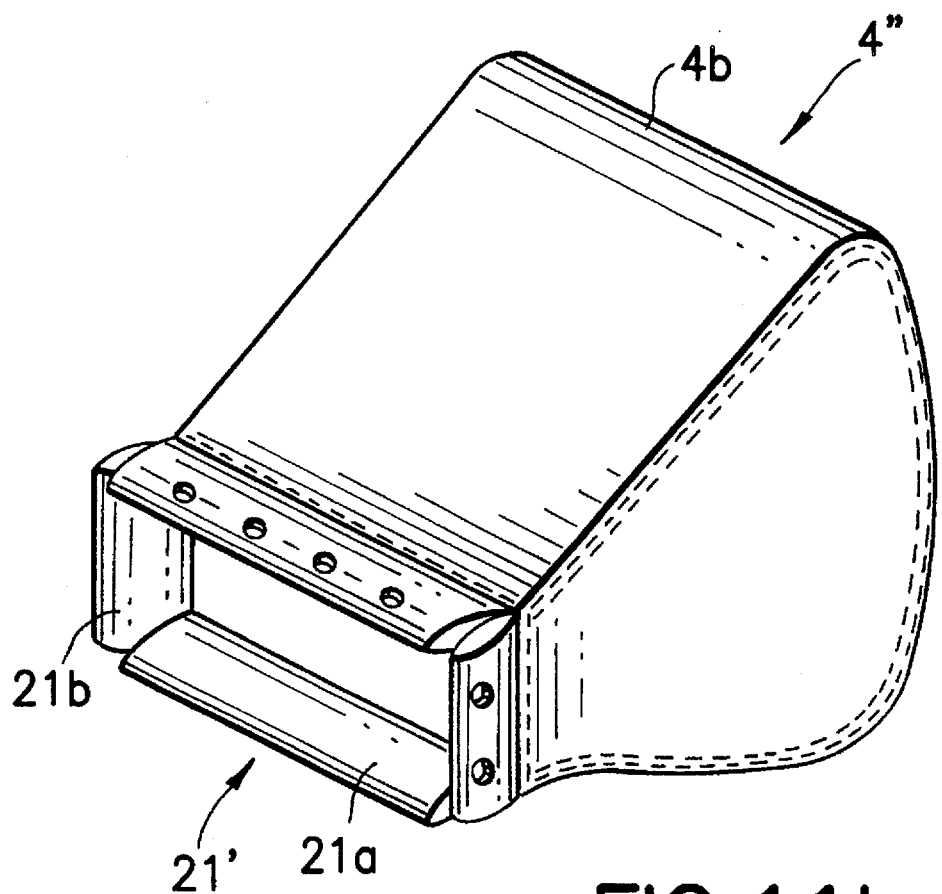
FIG. 11b is a perspective view of an airbag and rim opening of a prior art device.
Figure 12:
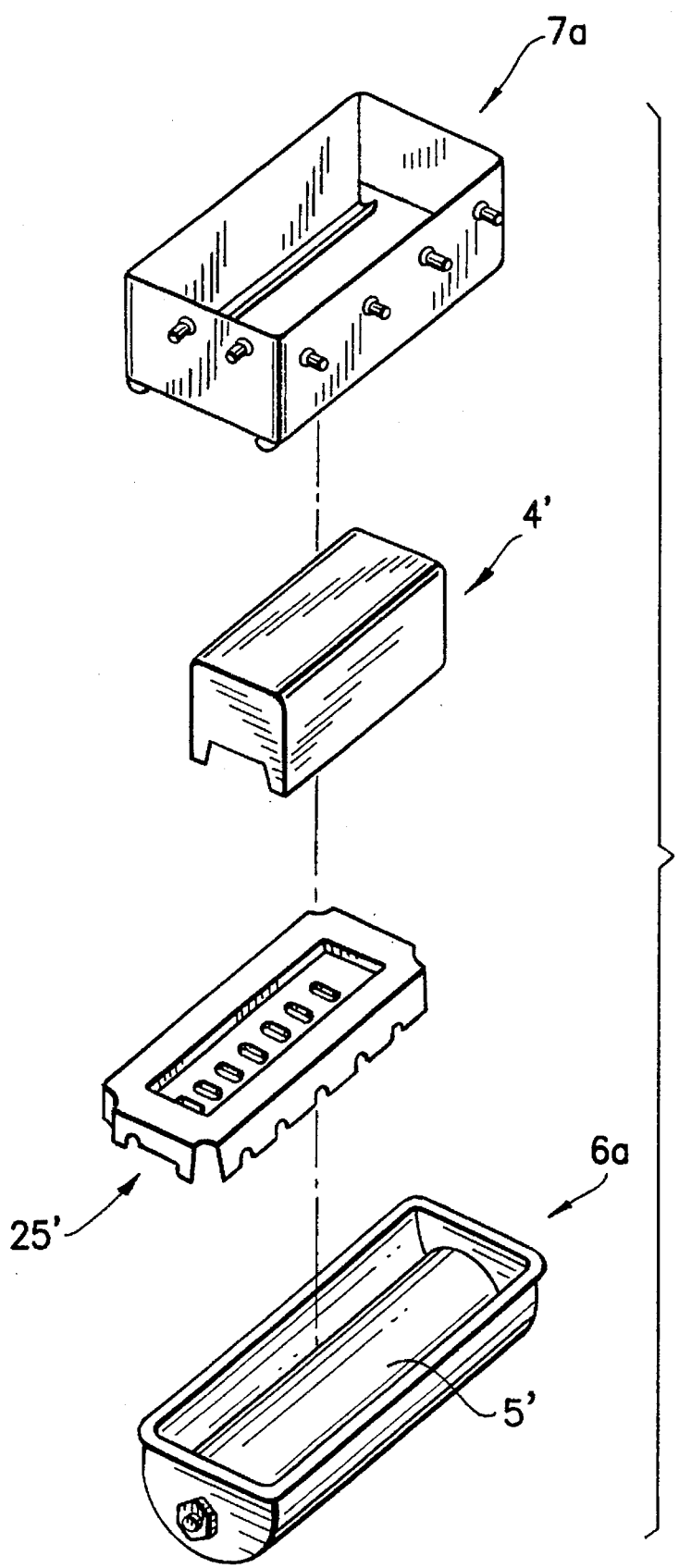
FIG. 12 is an exploded view of a prior art airbag device.

Referring to FIGS. 4 and 10, an alternative embodiment includes a pocket 31d in rim 21 of airbag 4 so that a shaft 32 is easily inserted into pocket 31d. Pocket 31d is divided into first and second portions by a notch 21e in rim 21, thereby allowing pocket 31d to extend below a level of bag support piece 17. Shaft 32 is inserted and engaged through insertion hole 33 in side plate 8 of container 3. Shaft 32 continues through the first portion of pocket 31d, through guide hole 18 in bag support piece 17, and through the second portion of pocket 31d. After shaft 32 is inserted through container 3 and pocket 31d, it is fixed in place by an engagement bolt 19 threaded into a threaded hole 19a.

Airbag 4 is optionally attached to first lengthwise side of container 3 using only resin clips 22, shaft 32, or both. Using both resin clips 22 and shaft 32 strengthens the attachment.

Referring to FIG. 8, an alternative embodiment of the present invention employs a width a of bag storage area 7 greater than a width b of inflator storage area 6, thereby creating a shelf 41a along the lengthwise direction of container 3. This embodiment supports uninflated airbag 4 along both width and length of container 3. Further description is omitted since other aspects of this embodiment are identical to the first embodiment described.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An airbag device for a vehicle, comprising in combination with an airbag:

a container;

an inflator storage area in said container;

an inflator in said inflator storage area;

a bag storage area in said container, said airbag being stored in said bag storage area;

a perimeter of said inflator storage area being smaller than a perimeter of said bag storage area, thereby creating a shelf for said airbag to rest upon when uninflated;

means for connecting said inflator to said container;

said airbag having an opening;

a rim around said airbag opening;

a plurality of resiliently deformable resin clips, said resin clips being attached to said rim;

a corresponding plurality of slots in a wall of said bag storage area, said resin clips being inserted into said slots for securing said airbag rim to the bag storage area wall;

said resin clips deforming from an original shape thereof during insertion of said resin clips into said slots and resuming their original shape after completion of insertion into said slots;

a pocket in a lengthwise side of said rim;

a bag support piece transversely connected to said container in an upper portion of said inflator storage area; and said bag support piece having a hole therein, thereby permitting a shaft to be inserted through said pocket and said hole.

2. An airbag device according to claim 1, wherein each resin clip includes:

an attachment portion having a first end attachable to said rim;

an initial insertion piece attached to a second end of said attachment portion;

said initial insertion piece forming an obtuse angle with a first side of said attachment portion;

a hook attached to said initial insertion piece and to said second end of said attachment portion;

said hook forming an acute angle with a second side of said attachment portion;

said initial insertion piece deformably passing into a wall slot before said hook when attaching said airbag to said wall; and said initial insertion piece and said hook resiliently resuming an original shape after deformably passing into said slot.

3. An airbag device for a vehicle, comprising in combination with an airbag:

a container;

an inflator storage area in said container;

an inflator in said inflator storage area;

a bag storage area in said container, said airbag being stored in said bag storage area;

a perimeter of said inflator storage area being smaller than a perimeter of said bag storage area, thereby creating a shelf for said airbag to rest upon when uninflated;

means for connecting said inflator to said container;

said airbag having an opening;

a rim around said airbag opening;

a plurality of resiliently deformable resin clips, said resin clips being attached to said rim;

a corresponding plurality of slots in a wall of said bag storage area, said resin clips being inserted into said slots for securing said airbag rim to the bag storage area wall;

said resin clips deforming from an original shape thereof during insertion of said resin clips into said slots and resuming their original shape after completion of insertion into said slots;

at least one resin clip being enveloped by a cloth at said rim of said airbag; and said at least one resin clip being fitted into its corresponding slot while enveloped by said cloth.

4. A resin clip for attaching an airbag to a wall of an airbag device, said clip comprising:

an attachment portion having a first end attachable to a rim of said airbag;

an initial insertion piece attached to a second end of said attachment portion;

a hook attached to said initial insertion piece and to said second end of said attachment portion;

said initial insertion piece deformably passing into a slot before said hook when attaching said airbag to said wall;

said initial insertion piece and said hook resiliently resuming an original shape after deformably passing into said slot;

said resin clip being enveloped by a cloth; and said resin clip being fitted into said slot while enveloped.

* * * * *